Jan. 2, 1934.  M. S. TOWSON  1,941,767
INDUSTRIAL TRUCK
Filed Dec. 3, 1927  3 Sheets-Sheet 1
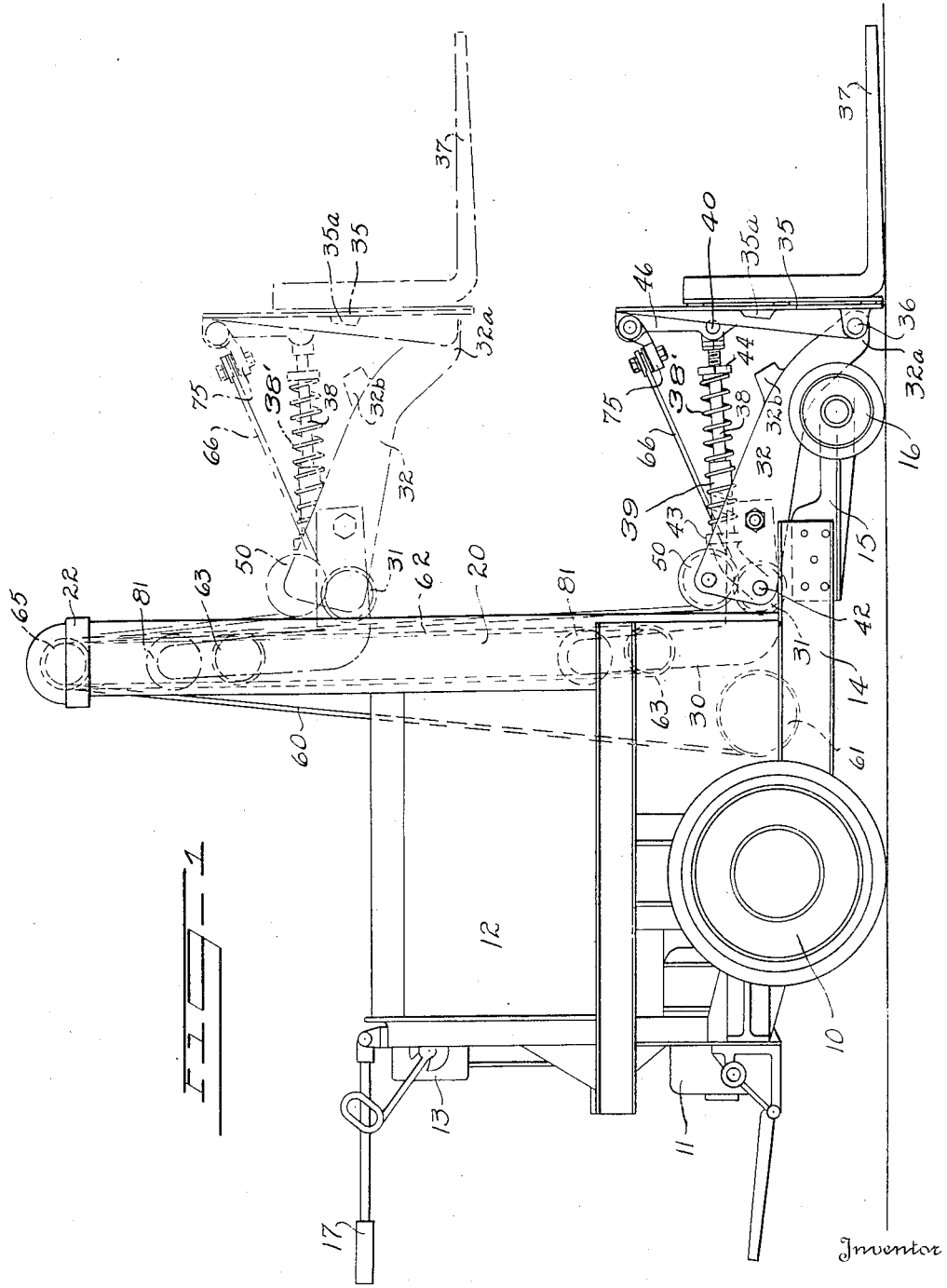
Inventor
Morris S. Towson
By Bates Macklin Golrick & Teare
Attorneys

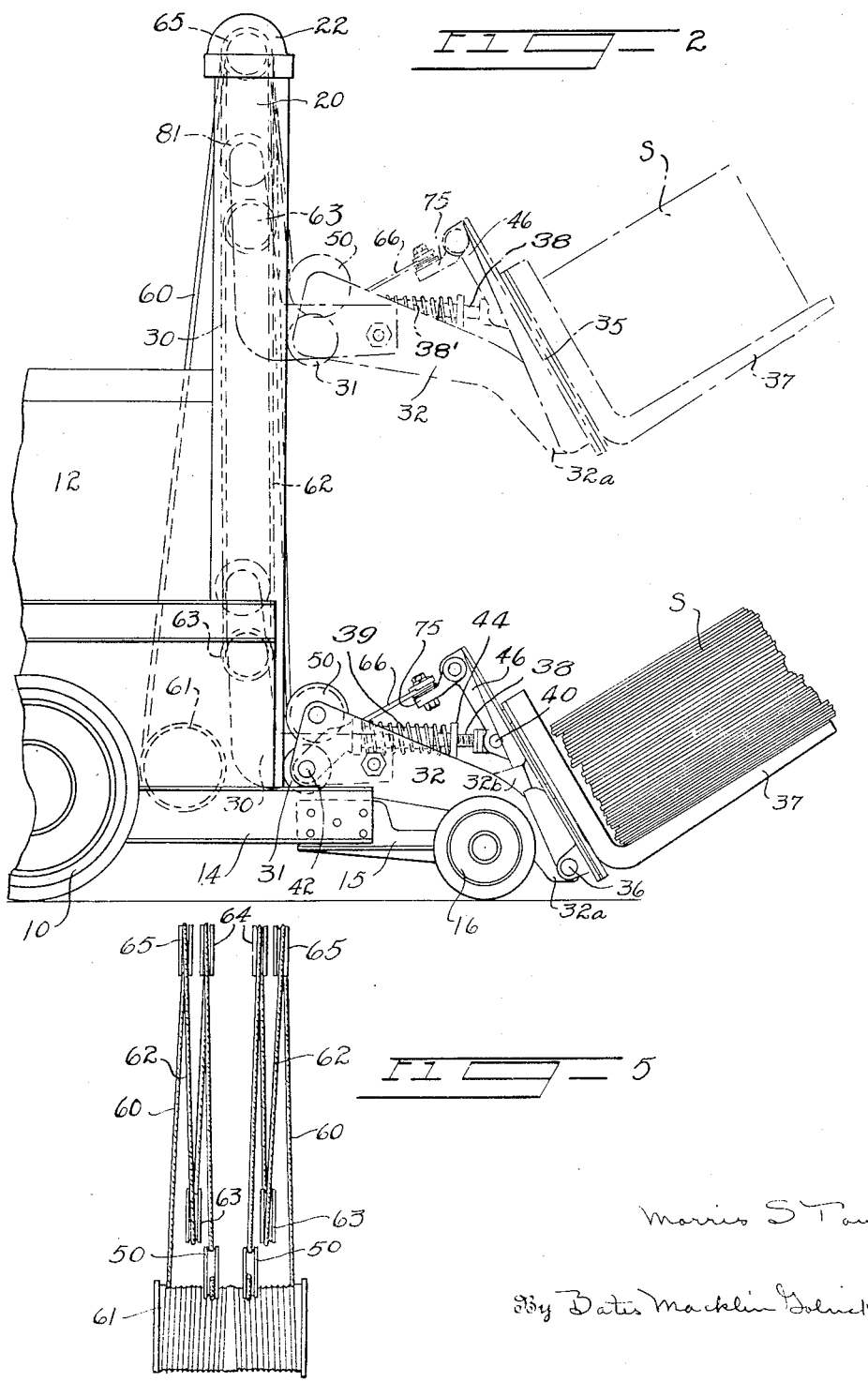

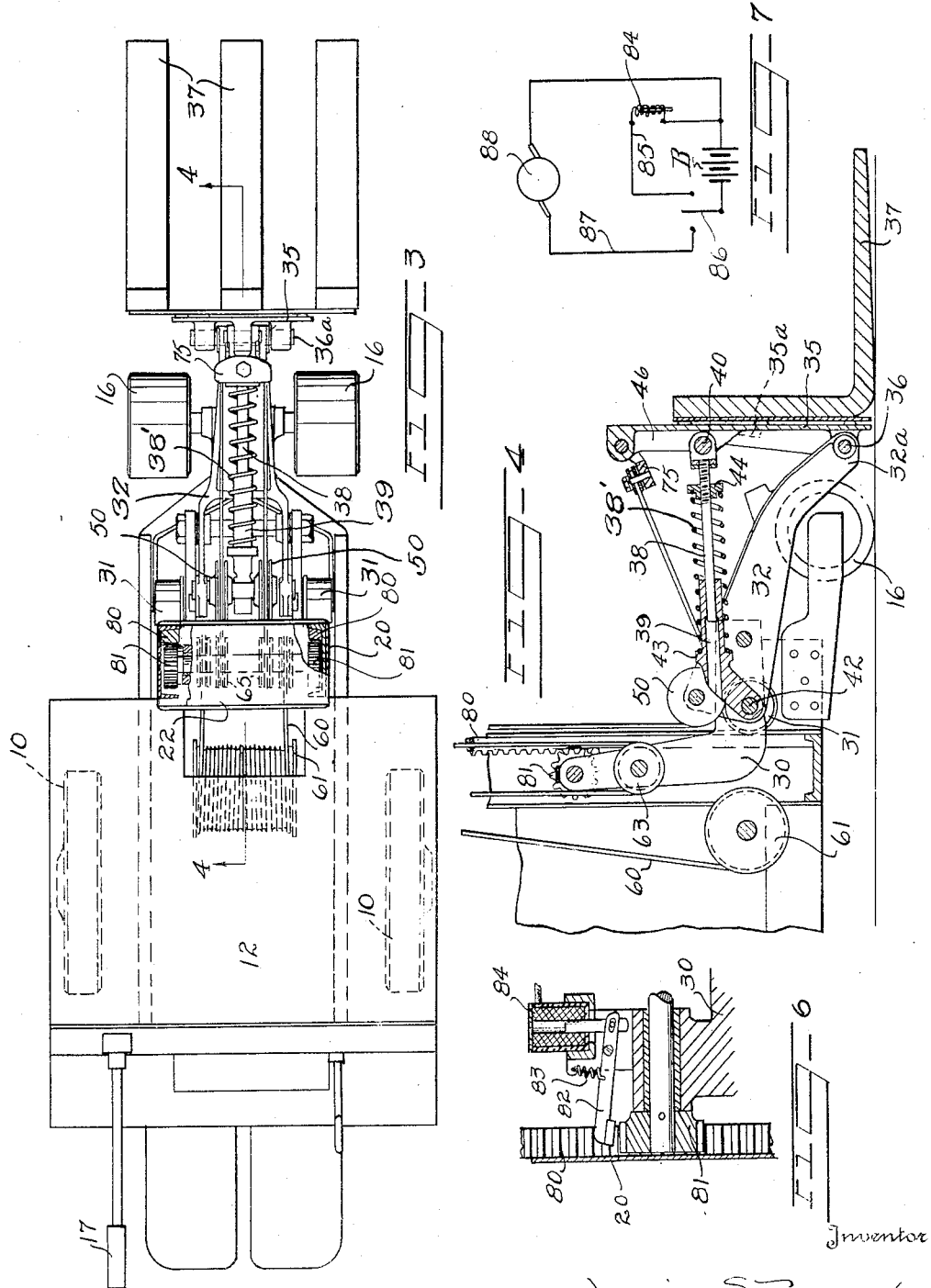

Patented Jan. 2, 1934

1,941,767

UNITED STATES PATENT OFFICE 1,941,767

INDUSTRIAL TRUCK

Morris S. Towson, Shaker Heights, Ohio, assignor to The Elwell Parker Electric Company, Cleveland, Ohio, a corporation of Ohio Application December 3, 1927. Serial No. 237,414

14 Claims. (Cl. 187—11)

This invention is concerned with industrial trucks and has for its general object the provision of an improved mechanism for engaging and elevating certain types of loads wherein difficulty is encountered frequently by the load becoming displaced during the transportation thereof by the truck.

More specifically my invention is concerned with the provision of the load elevating and load tilting mechanism in association with a truck of the so-called tier lift type, the use of which will permit the engagement of a load disposed on skids or blocks, whereupon the load may be tilted inwardly toward the truck frame and thereafter the load may be elevated vertically, and thereafter the load may be disposed at any desired elevated or tiered position within the elevating range of the truck.

Other objects of my invention will hereinafter become apparent from the following description referring to the accompanying drawings, which illustrate a preferred embodiment thereof. The essential characteristics are summarized in the claims.

In the drawings in Fig. 1, I show an industrial truck of the tier lift type in side elevation and equipped with my improved load elevating and tilting mechanism; in Fig. 2 I show a view similar to Fig. 1 illustrating the manner in which a load is tilted before any elevating movement thereof takes place; Fig. 3 is a plan view of an industrial truck incorporating the features of my invention; Fig. 4 is a cross sectional fragmentary section of a load elevating and tilting means, the section corresponding to a plane indicated by the lines 4—4 of Fig. 3; Fig. 5 is a detail illustrating a duplex cable winding mechanism which may be utilized to actuate the load elevating means. Fig. 6 is a cross-sectional detail of a locking means and Fig. 7 is a motor wiring diagram.

My invention contemplates provision of a load engaging, tilting and elevating mechanism, which may be in the form of an attachment utilizable with or adaptable to a so-called tier lift industrial type of truck, and I provide an elevating mechanism which has in pivotal association therewith a load engaging or tilting means which may be operated by means which also actuates the load elevating mechanism prior to any elevating movement of the load.

In Fig. 1 of the drawings I show an industrial truck of the tier lifting type, comprising a pair of power driven wheels 10, which are driven by a motor 11 energized by a battery 12, the usual control 13 being provided for the traction motor. The motor 11 and battery 12 are carried by a frame or chassis construction whereby the battery 12 is supported above the traction motor 11 at one end of the truck. Rearwardly extending chassis frame members 14 afford attaching means for a frame member 15, to which is dirigibly attached small steering wheels 16, the wheels 16 being steered by the lever 17 through a connecting mechanism (not shown).

Intermediate the two pairs of wheels and adjacent the battery 12 is an upright frame construction, which may comprise channel members 20 rigidly attached to or built into the truck frame, these upright members being connected at the top by a sheave supporting frame 22.

Traversing the upright frame is an elevating mechanism, which may comprise L-shaped members 30, in which is mounted shaft 42 to which are rigidly attached rollers 31, the rollers being disposed to contact with the flanges of the channel members 20 to guide the elevating mechanism. Attached to these members 30 is an outwardly extending arm 32, which extends over or overhangs the small wheels 16 and terminates adjacent the ground level. The arm or frame member 32 is provided with a pivotal end 32a affording pivotal connection for a tiltable frame member 35 disposed to extend outwardly beyond the wheels 16.

The frame member 35 has mechanism cooperating therewith and in association with the elevator members 30 in such manner that the mechanism for elevating the members 30 also serves to tilt the frame 35 relative to the elevating mechanism. Hence the frame member 35 has attached thereto L-shaped fork members 37, and the fork members and frame 35 may be considered an integral construction, insofar as any of the operative features of my invention are concerned. The frame 35 is pivotally connected to the portion 32a of the frame 32 by a pivot pin 36 adjacent the elbows of the fork members 37, and the upper end of the frame 35 is resiliently connected to the elevating mechanism through a spring actuated pin 38, pivotally attached to the frame 35 at 40, the pin 38 sliding in the guide member 39, which is pivotally connected at 42 to the elevator members 30. A spring 38' is disposed to react between a shoulder 43 on the guide member 39 and a flanged member 44 carried on the pin 38, whereby the spring tends to maintain the frame 35 and its forks 37 in a normally horizontal position, as shown by the full lines in Figs. 1 and 4.

The elevator members 30 may be actuated up and down the channel members 20 by a duplex cable and winding drum mechanism, and I preferably provide a duplex cable hoist with two stretches of cable 60 which are wound about drum 61 (see Figs. 3 and 5), the drum 61 being driven by a motor, (not shown) and controlled from the operator's position on the forward end of the truck. The stretches 60 extend upwardly over respective sheaves 65 at the top of the upright frame, thence downwardly as at 62 over sheaves 63 on the elevator member 30, thence upwardly over sheaves 64 at the top of the upright frame, thence downwardly below sheaves 50 on the elevator part 32, the joining portion of the cable stretches being anchored, as on an equalizing bar 75, to an upwardly extending arm 46 on the tilting frame 35.

The spring 42 is adjusted to have sufficient reaction to maintain the fork members 37 in horizontal position and resist the reaction of the cables 66 when the elevating and tilting mechanism is raised and lowered without a load on the fork members 37, but when the fork members 37 are inserted beneath a load and the winding mechanism is started, the elevating and tilting mechanism will be raised as a unit until the fork members 37 contact with the bottom of the load. Thereafter a continued taking up of the cable stretches by the drum 61 will cause the load to be tilted by reason of the fact that the spring 42 becomes compressed and the load is tilted about the pivot 36 until an abutment 35a on the frame 35 contacts with an abutment 32b on the frame member 32, thus preventing any further compressing of the spring member 42, and the entire mechanism is then elevated by the cables (see Figs. 1 and 2). When it is desired to deposit the load at an elevation as shown by the dot and dash lines in Fig. 2, the truck may be manœuvred to bring the load over the surface upon which it is to be deposited, and upon paying out of the cables by the drum, the lowermost edge of the fork members of frame 35 will contact with such surface, thus permitting the frame member 35 to move relative to the elevating frame comprising members 30 and 35. The load will thus be swung to a horizontal position.

To permit the load to be swung to horizontal position without any lowering movement of the elevating frame members 30 and 35, the spring 42 is sufficiently compressed so that its reaction member 39 may act as a friction brake on the shaft 42 assuming this shaft is rigid with the rollers 31, thereby retarding the rollers 31 and preventing the frame members from lowering while the load is swung to horizontal position. The braking effect in such case is exerted at the surfaces of the member 39 embracing the shaft 42.

If desired, a locking mechanism may be provided which will function to arrest any lowering movement of the elevating frame members 30 and 35, thus permitting the cables to be paid out to permit the load to be swung to horizontal position in the absence of any supporting surface beneath the forks when the same are suspending a load at an elevation. Such a mechanism (see Fig. 6) may comprise a rack member 80 secured to a flange of one of the channel members 20 and a pinion 81 carried by the shaft which supports one of the rolls 31, the pinion meshing with the rack. The pinion may be prevented from rotating by a dog or pawl 82 to thus positively prevent traversing movement of the elevator 30. The dog or pawl is maintained in a normal pinion nonengaging position by a spring 83. The dog is shown as arranged to be shifted into engagement with the teeth of the pinion 81 by a solenoid 84, the coil of which is in a circuit 85 controlled by a switch 86 which is diagrammatically shown as arranged to connect the source of power B selectively to the circuit 85 and to the motor circuit 87 of the drum actuating motor 88. By the use of such a switch, the motor cannot be started while the locking pawl 82 is in engagement with the pinion 81. It is to be understood that there may be, in association with the winding drum 61, a suitably actuated brake (not shown) which will prevent any unwinding movement of the drum when the power to the motor is shut off, such brake being released to permit lowering of the load only when the motor is operatively connected to the drum. Such an arrangement is shown in the patent to Edward J. Abbe, No. 1,688,131.

From the foregoing description of my invention, it will be seen that I provide in association with a tier-lift truck, a load elevating and a load tilting mechanism having a wide range of utility for handling loads having various physical characteristics. In the drawings, it will be noticed that I have shown the apparatus as functioning to handle a stack "S" (see Fig. 2) of unbound sheets of metal, but it is apparent that the apparatus is adaptable to the engaging, tilting, elevating and transporting of a variety of types of loads.

I claim:

1. In an industrial truck of the character described, the combination of a load elevating means and a tilting means movable relative thereto, means for raising both the said means, said raising means being connected to the tilting means in such manner that the tilting means is tilted consequent upon such raising operation and resilient means tending to maintain the tilting means in a normally horizontal load supporting position.

2. In an industrial truck of the character described, the combination of a truck frame mounted upon pairs of forwardly and rearwardly disposed wheels, an upright frame construction mounted upon said truck frame in rigid relation thereto and intermediate said pairs of wheels, an elevating mechanism operable upon said upright frame construction, means for causing said elevating mechanism to traverse said upright frame, a load engaging and tilting mechanism mounted upon the elevating mechanism to be disposed in operative position beyond the end of the truck frame, said load engaging mechanism being tiltable by the means for operating the elevating mechanism when the elevating mechanism is in elevated position, and means for restoring the tiltable load engaging mechanism to load engaging position when the elevating mechanism is in raised and lowered position.

3. In an apparatus of the character described, a vertically elevatable means, means for actuating said elevatable means, a load engaging mechanism associated with said means whereby said load engaging means may be inserted beneath a load mounted upon a skid, said load engaging means being tiltable toward the elevating mechanism, and resilient means interposed between said means and mechanism tending to normally maintain said load engaging means horizontally.

4. In an industrial truck, an elevator guide, load engaging and tilting means mounted on and arranged to traverse the guide, mechanism for raising and lowering said means on the guide including a power device connected to the said load engaging and tilting means, means for causing the raising and tilting operations in sequence, and means operating on the aforesaid means to enable the power device to tilt the load in two directions while raised to various heights.

5. In an industrial truck, the combination of an upright guide mounted on the truck, a load carrier mounted for raising and lowering movement on the guide, said carrier including a tilting load engaging means swingable inwardly toward the guide to a load carrying position and swingable to a substantially horizontal loading and unloading position, there being means to arrest the carrier in its vertical movement, and means acting on the load engaging means consequent upon such arrest of the carrier to swing the load engaging means to such horizontal position.

6. In an industrial truck, the combination of an upright guideway mounted on said truck, a carriage mounted to traverse said guideway, means for causing the carriage to traverse the guideway, a load engaging and tilting mechanism mounted on the carriage, said load engaging mechanism arranged to be tilted by said first-named means, and means for restoring the load engaging mechanism to a load engaging position.

7. In an apparatus of the class described, a vertically elevatable means, means to actuate said elevatable means, a load engaging mechanism associated with said means, said load engaging mechanism being tiltable towards the elevating mechanism, and means acting on the load engaging mechanism and arranged to normally retain the load engaging mechanism substantially horizontal.

8. In an industrial truck, the combination of a substantially upright guideway mounted on the truck, a carriage mounted to traverse the guideway, a load engaging mechanism tiltably mounted on the carriage to tilt said load engaging mechanism, means acting on the load-engaging mechanism and arranged to normally retain said load-engaging mechanism substantially horizontal, and tilting means operative to tilt the load engaging mechanism only when said mechanism is in engagement with a load.

9. In an industrial truck, an upright guideway mounted on the truck, a carriage mounted for vertical movement on said guideway, a load engaging and tilting mechanism mounted on the carriage, means to tilt the load engaging mechanism, means to raise and lower the carriage on the guideway, and means to retain the load engaging mechanism in a normal or untilted position when said mechanism is not in engagement with a load.

10. In an apparatus of the class described, a substantially vertical guideway, a carriage mounted for vertical movement on said guideway, a load engaging mechanism tiltably mounted on said carriage, common means to raise the carriage and tilt the load engaging mechanism, means arranged to counterbalance the weight of the load engaging mechanism whereby the raising means will not tilt such load engaging mechanism when there is no load thereon.

11. In an industrial truck, the combination of an upright guideway mounted on said truck, a carriage mounted for vertical movement in the guideway, a load engaging mechanism pivotally mounted on the carriage, means to rock the load engaging mechanism about its pivot, said means also acting to raise and lower the carriage in the guideway, and means acting on the load engaging mechanism to cause said mechanism to traverse the guideway in a substantially horizontal position when no load is present thereon.

12. In apparatus of the class described, the combination of a wheel mounted frame, a vertical guide mounted on said frame, an elevating member movably mounted on said guide and comprising a main portion and a carrier movably mounted on said main portion to swing inwardly to a tilted position, and means for raising and lowering said elevating member, said means being connected to said carrier and operatively engaging the main portion of said elevating member and arranged to tilt the carrier when said means is operated to raise said member, and yieldable means between said carrier and the main portion of said elevating member serving to prevent tilting of the carrier except when a load is mounted on the latter.

13. In apparatus of the class described, the combination of a wheel mounted frame, a vertical guide mounted on said frame, an elevating member comprising a main portion mounted on said guide to move upwardly and downwardly thereon and a carrier swingable on said main portion into an inwardly tiltable position, means for raising and lowering said elevating member, said means being connected with said carrier and operatively engaging the main portion of said elevating member and arranged when operated to raise said member to first tilt said carrier and to maintain the latter tilted during raising and lowering of said member, and means for arresting the downward movement of said elevating member in any predetermined position throughout the travel thereof.

14. In an industrial truck, the combination of a wheel mounted frame, a substantially vertical guide thereon, an elevator comprising a member slidable on said guide and a load carrier pivoted on said member to tilt inwardly and outwardly, and hoisting means on said frame including a flexible member having connection with said slide member and carrier, adapted to tilt the latter when said hoisting means is operated, and means normally tending to tilt said carrier outwardly and arranged to prevent inward tilting thereof except when said carrier engages a load.

MORRIS S. TOWSON.